(12) United States Patent
Collins et al.

(10) Patent No.: US 8,687,867 B1
(45) Date of Patent: *Apr. 1, 2014

(54) COMPUTER-AIDED DETECTION AND CLASSIFICATION OF SUSPICIOUS MASSES IN BREAST IMAGERY

(75) Inventors: Michael J. Collins, Beavercreek, OH (US); Kevin Woods, Beavercreek, OH (US); Brent Woods, Fairborn, OH (US); William Pierson, Beavercreek, OH (US); Ryan McGinnis, London, OH (US)

(73) Assignee: iCad, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,808

(22) Filed: May 7, 2012

Related U.S. Application Data

(63) Continuation of application No. 12/211,593, filed on Sep. 16, 2008, now Pat. No. 8,175,351.

(51) Int. Cl.
*G06K 9/00* (2006.01)
*A61B 6/04* (2006.01)
*G01N 23/00* (2006.01)

(52) U.S. Cl.
USPC ........................ 382/128; 378/4; 378/37

(58) Field of Classification Search
USPC ................... 378/37, 62, 4, 19; 382/128, 224, 382/130–132
See application file for complete search history.

(56) References Cited

U.S. PATENT DOCUMENTS

| | | | |
|---|---|---|---|
| 6,091,841 A | 7/2000 | Rogers et al. | |
| 6,198,838 B1 | 3/2001 | Roehrig et al. | |
| 6,246,782 B1 * | 6/2001 | Shapiro et al. | 382/128 |
| 6,301,378 B1 | 10/2001 | Karssemeijer et al. | |
| 6,549,646 B1 | 4/2003 | Yeh et al. | |
| 6,580,818 B2 | 6/2003 | Karssemeijer et al. | |
| 7,054,473 B1 | 5/2006 | Roehrig et al. | |
| 7,298,877 B1 | 11/2007 | Collins et al. | |
| 7,490,085 B2 | 2/2009 | Walker et al. | |
| 7,556,602 B2 | 7/2009 | Wang et al. | |
| 7,593,561 B2 | 9/2009 | Zhang et al. | |
| 7,777,731 B2 | 8/2010 | Baumgart | |
| 2004/0101181 A1 | 5/2004 | Giger et al. | |

OTHER PUBLICATIONS

Kwok, et al., "Automatic Pectoral Muscle Segmentation on Mdiolateral Oblique View Mammograms", "Recent Advances in Breast Imaging, Mammography, and Computer-Aided Diagnosis of Breast Cance", 2006, pp. 613-636, Publisher: SPIE Press, Published in: US.

(Continued)

*Primary Examiner* — Irakli Kiknadze
(74) *Attorney, Agent, or Firm* — Keri E. Sicard; William A. Loginov; Loginov & Sicard

(57) ABSTRACT

Systems and methods are presented that detect and classify mass-like regions exhibiting spiculated and/or dense characteristics with high sensitivity and at acceptable false positive rates. One or more suspicious masses are identified in medical imagery of the breast. In certain embodiments, a quantitative measure of spiculation and quantitative measure of density are computed for each suspicious mass located. At least one classification scheme, developed using true and false positives with similar quantitative measures, is then selected for each suspicious mass according to both quantitative measures. In certain other embodiments, a measure of breast location is computed for each suspicious mass. In one embodiment, the location determines whether a suspicious mass appears inside or outside of the parenchyma region of the breast.

9 Claims, 8 Drawing Sheets

(56) References Cited

OTHER PUBLICATIONS

Li, et al., "Med. Phys", 212001, pp. 250-258, vol. 28, No. 2, Published in: US.

Wei, et al., "Med. Phys.", Nov. 2006, pp. 4157-4168, vol. 33, No. 11, Published in: US.

Xu, et al., "Snakes, Shapes, and Gradient Vector Flow", "Trans. on Image Processing", 1998, pp. 359-369, vol. 7, No. 3, Publisher: IEEE, Published in: US.

Kuncheva, et al., "A Theoretical Study on Six Classifer Fusion Strategies", "Transactions on Pattern Analysis and Machine Intelligence", Feb. 2002, pp. 281-286, vol. 24, No. 2, Publisher: IEEE, Published in: US.

* cited by examiner

COMPUTER-AIDED DETECTION AND CLASSIFICATION OF SUSPICIOUS MASSES IN BREAST IMAGERY

RELATED APPLICATION

This application is a continuation of co-pending U.S. patent application Ser. No. 12/211,593, filed Sep. 16, 2008, entitled COMPUTER-AIDED DETECTION AND CLASSIFICATION OF SUSPICIOUS MASSES IN BREAST IMAGERY, the entire disclosure of which is herein incorporated by reference.

BACKGROUND

Mammographic computer-aided detection (CAD) systems have existed in research environments since the 1960's. Currently available systems find indicators of cancer in mammograms and present such findings to radiologists. Typical indicators of cancer include clusters of microcalcifications and masses.

Masses are the more difficult cancer indicator for CAD systems to accurately identify. There are several reasons for this. First, there are a wide variety of types of cancerous masses in the breast, ranging from spiculated or stellate masses (henceforth referred to as "speculations") to masses with significant core or density (henceforth referred to as "densities"). A visual illustration depicting these various types of cancerous masses can be seen in FIG. 1 of U.S. Pat. No. 6,198,838, "Method and system for detection of suspicious lesions in digital mammograms using a combination of spiculation and density signals," assigned to R2 Technology, Inc.

As is known in the art, mammographic CAD systems identify cancerous masses by performing two overall steps. First, mass-like regions (i.e., candidates) in the breast are detected at extremely high sensitivity so that all potential cancers (i.e., true positives) are identified. Candidates are typically detected by computing information related to regions in the breast having radiating or converging lines, boundaries, and/or by computing information related to the shape or boundary of regions in the breast having a defined core or density. By detecting at high sensitivity, a significant number of non-suspicious or benign mass-like regions (i.e., false positives) will also be detected at this first step. Examples of such false positives include lymph nodes, skin folds, skin line, nipples, parenchyma structures, blood vessels, sensor noise, areas of low contrast difference, pacemakers, implants, scars, etc. Like cancerous masses, these structures also exhibit widely varying feature characteristics, making it impossible for detection algorithms alone to avoid the detection of false positives. Thus, mammographic CAD systems perform a second step in which feature measurements are computed on each candidate and collectively used to label each candidate to a class, such as whether the candidate is a true positive that should be presented or whether the candidate is a false positive that should be disregarded. Mammographic CAD systems vary as to the approaches used in this second step. Several notable prior art approaches will now be introduced by way of reference.

In U.S. Pat. No. 6,198,838, Roehrig et al. compute a single vector of feature measurements (i.e., a feature vector) on all mass-like candidates. The vector includes features that are computed on both the radiating and converging lines of the candidate (i.e., spiculated characteristics) and features that are computed on the core or density of each candidate (i.e., dense or mass characteristics). The feature vector is then input to a single classification algorithm, such as a linear classifier or a neural network, that classifies all candidates as either a true positive or false positive. Candidates that have both spiculated and dense characteristics that are well-defined are accurately classified, as the vector input to the algorithm is weighted with a combination of such feature measures. However, it is important to realize that many candidates will have only spiculated characteristics and many other candidates will have only dense characteristics. Furthermore, the single classification algorithm will be limited in the total number of spiculated and dense feature measures it can use, due to limitations associated with the overtraining of classifiers, the type of classification algorithm used, the speed of computational performance, etc. Thus, classification may be performed with suboptimal accuracy on candidates that have only spiculated characteristics and on candidates that have only dense characteristics, resulting in a reduced sensitivity (i.e., a high false negative rate) and/or a high false positive rate (i.e., poor specificity) for such candidates.

In U.S. Pat. No. 7,298,877, "Information fusion with Bayes networks in computer-aided detection systems," assigned to iCAD, Inc., Collins et al. attempt to overcome the limitations of Roehrig et al. In this patent, a feature vector of spiculated characteristics is computed on candidate masses identified by a spiculation detection algorithm and a feature vector of core characteristics is computed on candidate masses identified by a density detection algorithm. Each feature vector is then input to a separate Bayesian network classification algorithm that classifies each respective set of candidates as either a true positive or false positive. Candidates that have only spiculated characteristics that are well-defined and can be measured by the spiculated feature vector are accurately classified. Furthermore, candidates that have only density characteristics that are well-defined and can be measured by the density feature vector are accurately classified. However, neither Bayesian network classification algorithm classifies candidates that have both spiculated and dense characteristics with optimal accuracy, as neither feature vector characterizes such a combination.

Thus, a mammographic CAD system that classifies all mass-like regions with high sensitivity and at acceptable false positive rates is still desired.

It is therefore an object of this invention to classify mass-like regions exhibiting both spiculated and dense characteristics with high sensitivity and at acceptable false positive rates.

It is another object of this invention to classify mass-like regions exhibiting only dense characteristics with high sensitivity and at acceptable false positive rates.

It is yet a further object of this invention to classify mass-like regions exhibiting only spiculated characteristics with high sensitivity and at acceptable false positive rates.

SUMMARY

In accordance with one aspect of the present invention, there is provided a method for the automated detection and classification of suspicious mass lesions in medical imagery of the breast, comprising the steps of locating one or more suspicious mass lesions in medical imagery of the breast, computing a quantitative measure of spiculation and a quantitative measure of density for each suspicious mass located, selecting at least one classification scheme from a plurality of classification schemes based on the quantitative measure of spiculation and the quantitative measure of density; and classifying each suspicious mass by executing the at least one selected classification scheme.

FIGURES

DETAILED DESCRIPTION

In the following detailed description of embodiments, reference is made to the accompanying drawings that form a part hereof, and in which are shown, by way of illustration and not by way of limitation, specific embodiments in which the methods and systems disclosed herein may be practiced. It is to be understood that other embodiments may be utilized and that logical, mechanical, and electrical changes may be made without departing from the scope of the methods and systems disclosed herein.

Figure 1:
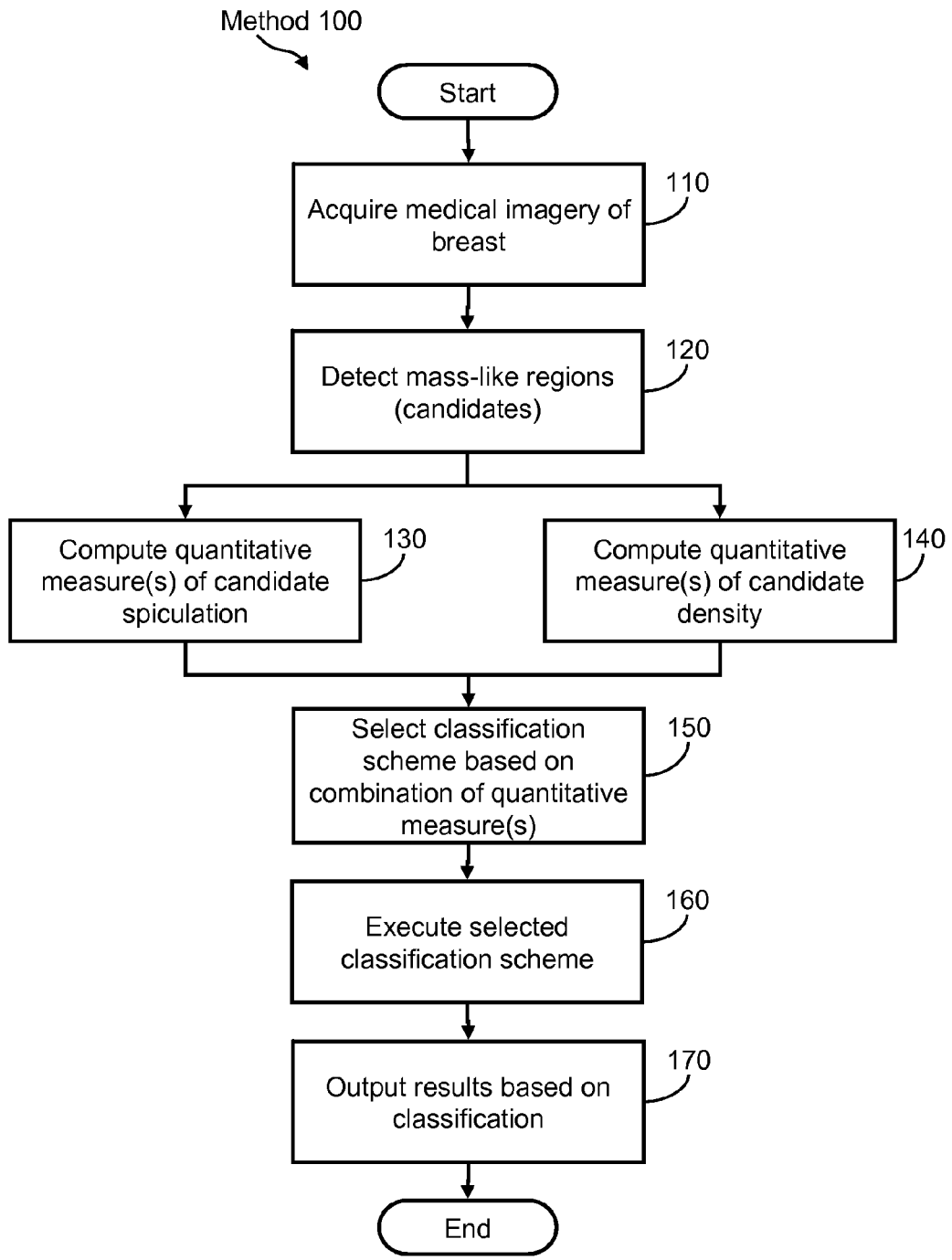
FIG. 1 illustrates the method steps performed by a CAD system to detect and classify mass true positives from mass false positives in medical imagery of the breast in accordance with one embodiment.

FIG. 1 is a flowchart setting forth the overall steps of a method 100 performed by a CAD system to detect and classify mass true positives from mass false positives in medical imagery of the breast. The overall steps performed in method 100 will first be summarized. Candidate masses are located in the breast region of the medical imagery. For each located candidate mass, quantitative measurements are computed as to the spiculation and density of the candidate. A classification scheme is then selected according to the quantitative measurements. Each classification scheme is uniquely developed based on the characteristics of true positives and false positives exhibiting similar quantitative measurements. Thus, classification results in higher sensitivity and at lower false positive rates than prior art methods of classifying masses.

Figure 8:
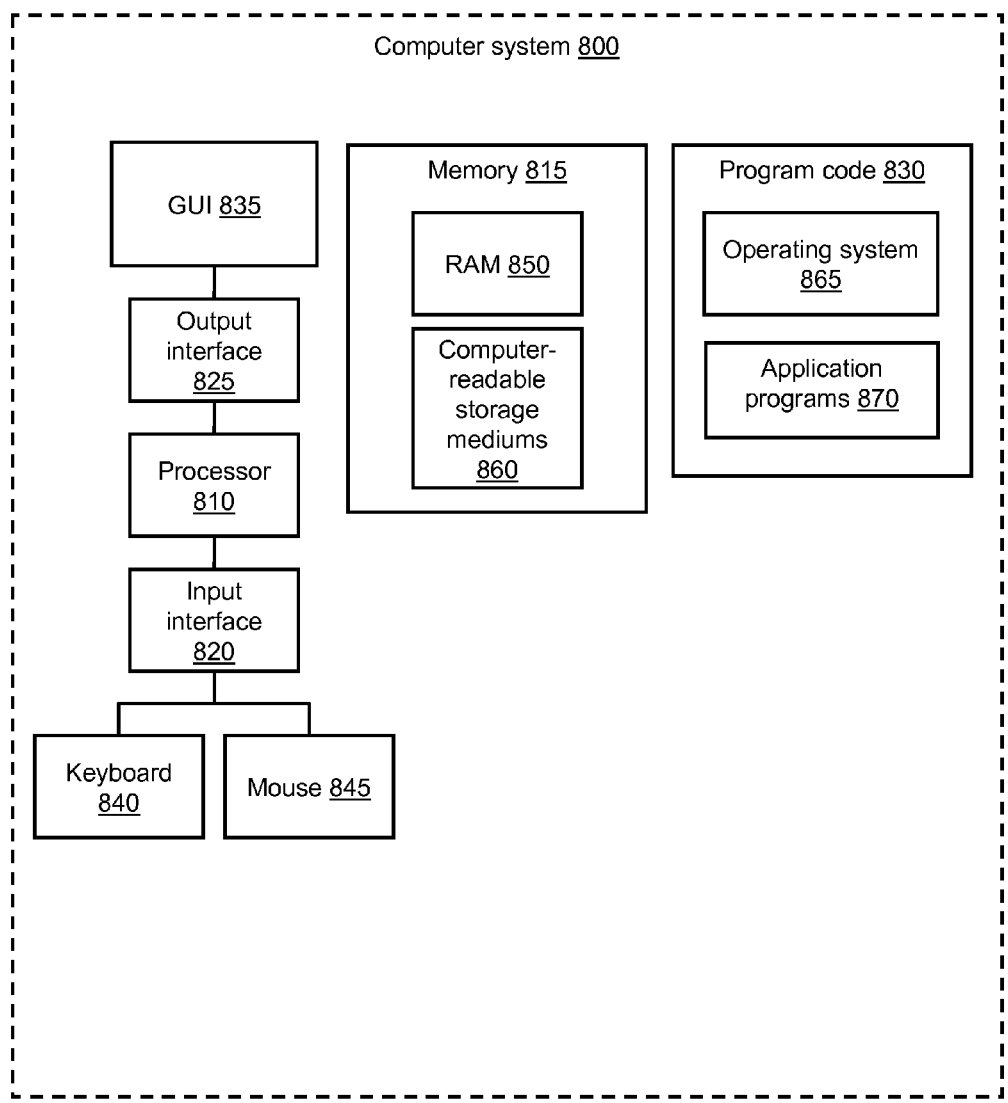
FIG. 8 is a block diagram of a computer system on which the methods disclosed herein may be practiced.

At step 110, medical imagery of the breast is acquired and input to a processing unit (e.g., a processor) of a CAD system or other suitable computing system for executing the methods disclosed herein to be fully described in reference to FIG. 8. Such medical imagery may include the craniocaudal (CC) and mediolateral oblique (MLO) mammographic images of both the right and left breasts. The imagery is transferred from an external system well-known in the art such as an acquisition station, a review workstation, a film digitizer, a conventional database (e.g. Picture Archiving & Communication System), etc. via a conventional input interface to the CAD system. The imagery may be further pre-processed to improve the efficacy of the mass detection and classification methods disclosed herein using image processing techniques well-known in the art. Examples of such techniques include, but are not limited to, grey-scale image normalization, image smoothing, cropping regions outside of the breast so that the methods disclosed herein are only executed within the breast region of the image, etc.

Detection of Mass-Like Regions

At step 120, candidate mass-like regions (i.e., candidates) are located in the breast region of the medical imagery. The breast region itself may be identified within the medical image using any number of techniques known in the art, such as, but not limited to, the algorithm disclosed in U.S. Pat. No. 6,091,841 "Method and system for segmenting desired regions in digital mammograms" assigned to Qualia Computing, Inc., which is incorporated herein by reference.

Numerous techniques for identifying mass-like regions in medical imagery are known in the art. In certain embodiments, candidate masses may be located by executing a "spiculation detection algorithm." For example, the spiculation detection algorithm described in U.S. Pat. No. 7,298,877, "Information fusion with Bayes networks in computer-aided detection systems," assigned to iCAD, Inc., may be utilized to perform step 120, which is incorporated herein by reference. In that patent, mass-like regions are identified that exhibit diametrically opposed radiating line structures. In certain other embodiments, candidate masses may be located by executing a "density detection algorithm." For example, the density detection algorithm described in U.S. Pat. No. 6,801,645, "Computer-aided detection of masses and clustered microcalcifications with single and multiple input image context classification strategies," assigned to iCAD, Inc., may be utilized to perform step 120, which is incorporated herein by reference. In that patent, mass-like regions are detected by identifying roughly circular, bright clusters of pixels. In further embodiments, candidate masses may be located by independently executing both spiculation and density detection algorithms. As is known in art, the independent nature of spiculation and density detection algorithms identify a larger number of total candidate mass-like regions and, more critically, a larger number of true positives than a single detection algorithm alone or multiple algorithms that depend on or share information with one another.

The CAD system may perform a segmentation step on the candidates identified at step 120. Segmentation is well-known in the field of CAD in which the boundaries of candidate regions detected in the image are located and refined, resulting in a more accurately defined region than detection algorithms alone can identify. Techniques for segmenting regions of interest in medical imagery are well known in the art. An example of an active contour technique that can be implemented for performing segmentation can be seen in "Snakes, shapes, and gradient vector flow," IEEE Trans. on Image Processing, vol. 7, no. 3, pp. 359-369, 1998 by C. Xu and J. L. Prince.

Measurement of Spiculation and Density Characteristics

Figure 2:
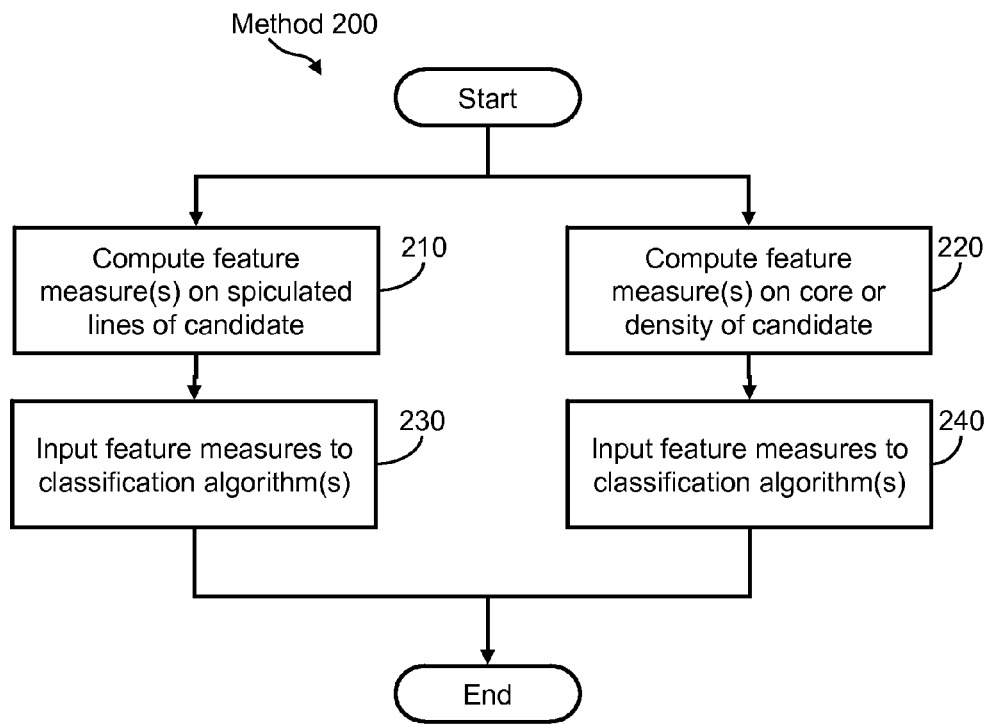
FIG. 2 illustrates the method steps performed by a CAD system to compute quantitative measurements of mass spiculation and mass density in accordance with one embodiment.

For each candidate identified at step 120, a quantitative measurement is computed as to the "spiculation" of the candidate at step 130 and a quantitative measurement is computed as to the "density" of the candidate at step 140. In one embodiment, each quantitative measurement may be determined using feature measurements related to each candidate mass identified at step 120. The steps of such a process are depicted in reference to FIG. 2. At step 210, one or more feature measurements may be computed on the spiculated lines of each candidate. Exemplary features include the texture, contrast, length, width, or number of lines. Many such features may be previously measured by and readily available from spiculation detection algorithms as fully described above. Independently, at step 220, one or more feature measurements may be computed on the core or density area of each candidate. Exemplary features include the size, shape, contrast, or texture of its core. Many such features may be previously measured by and readily available from density detection algorithms as fully described above. At steps 230 and 240, such feature measurements may be input as sets of separate parameters (i.e., a feature vector) to separate classification algorithms. There is no sharing of feature measurements between classification algorithms, so that independent and completely separate quantitative measurements may be computed for both the spiculation and the density of each candidate. A first classification algorithm computes a quantitative measurement based on the combination of spiculation feature measurements, and a second classification algorithm computes a quantitative measurement based on the combination of the density feature measurements. Each quantitative measurement may be, for example, a numerical score representing a value of the spiculated lines of each candidate (e.g., how well defined is the spiculation of the candidate) and a value of the core or density area of each candidate (e.g. how well defined is the core of the candidate).

In other embodiments, the quantitative measurements may be determined simply using the results of detection performed at step 120. It should be first recognized that, in certain embodiments where both a spiculation and a density detection algorithm are executed to perform step 120, a plurality of candidates will be identified by a spiculation detection algorithm, a plurality of candidates a density detection algorithm, and in some cases, a plurality of candidates will be identified by both a spiculation and a density detection algorithm. In accordance with one embodiment, to identify that a candidate has been detected by both algorithms, the CAD system may compute the centroid of all candidate masses identified by the spiculation detection algorithm and candidate masses identified by the density detection algorithm, then identify those candidates in which the centroid of one candidate is within any part of the segmented boundaries of another candidate. Thus, in certain embodiments, the quantitative measurements computed at steps 130 and 140 may be numerical (e.g., binary) indicators corresponding to whether each candidate was identified by only a spiculation detection algorithm, by only a density detection algorithm, or by both a spiculation and a density detection algorithm.

Figure 3:
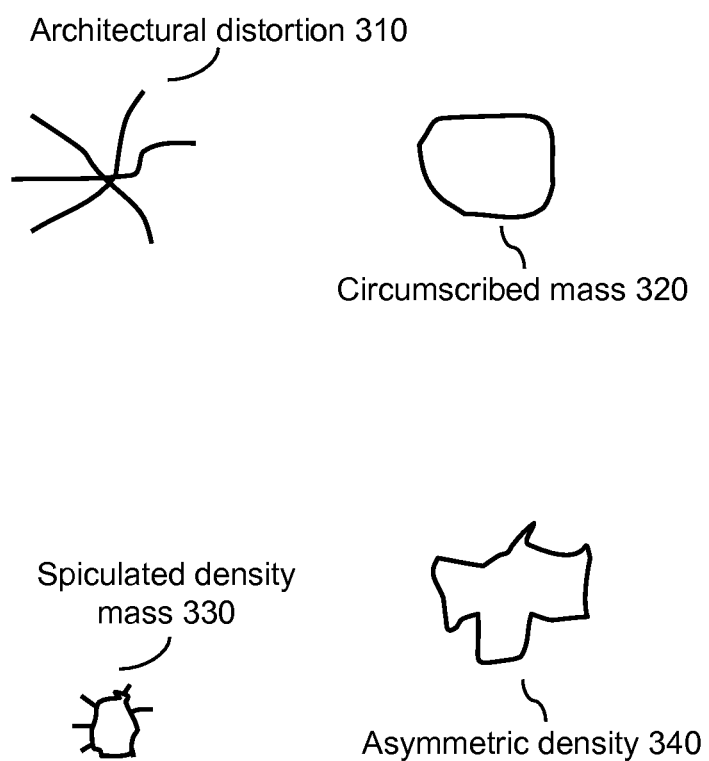
FIG. 3 illustrates four examples of malignant mass cancers, each having different combinations of quantitative measurements of spiculation and density.

At step 150, a classification scheme (i.e., one or more feature vectors and one or more classifier algorithms) is chosen based on a combination of the independent, quantitative measurements of spiculation and density computed at steps 130 and 140, respectively. The importance of dynamically choosing a classification scheme based on quantitative measurements of spiculation and density may be further understood by viewing examples of the types of malignant mass cancers in FIG. 3 that we are attempting to identify and isolate from one another. Architectural distortions 310 will generally have only a significant quantitative measurement of spiculation, circumscribed mass cancers 320 will generally have only a significant quantitative measurement of density, and both spiculated density mass cancers 330 and asymmetric density mass cancers 340 will generally have both a significant quantitative measurement of spiculation and density. The characteristics of these true positives and false positives corresponding to these three candidate types are sufficiently distinct from one another that they should be addressed using a classification scheme that are also sufficiently distinct from one another. Such distinctions may come in the form of feature measurements, classification rules, types of classifiers, etc. as will be further described hereinbelow.

Figure 4:
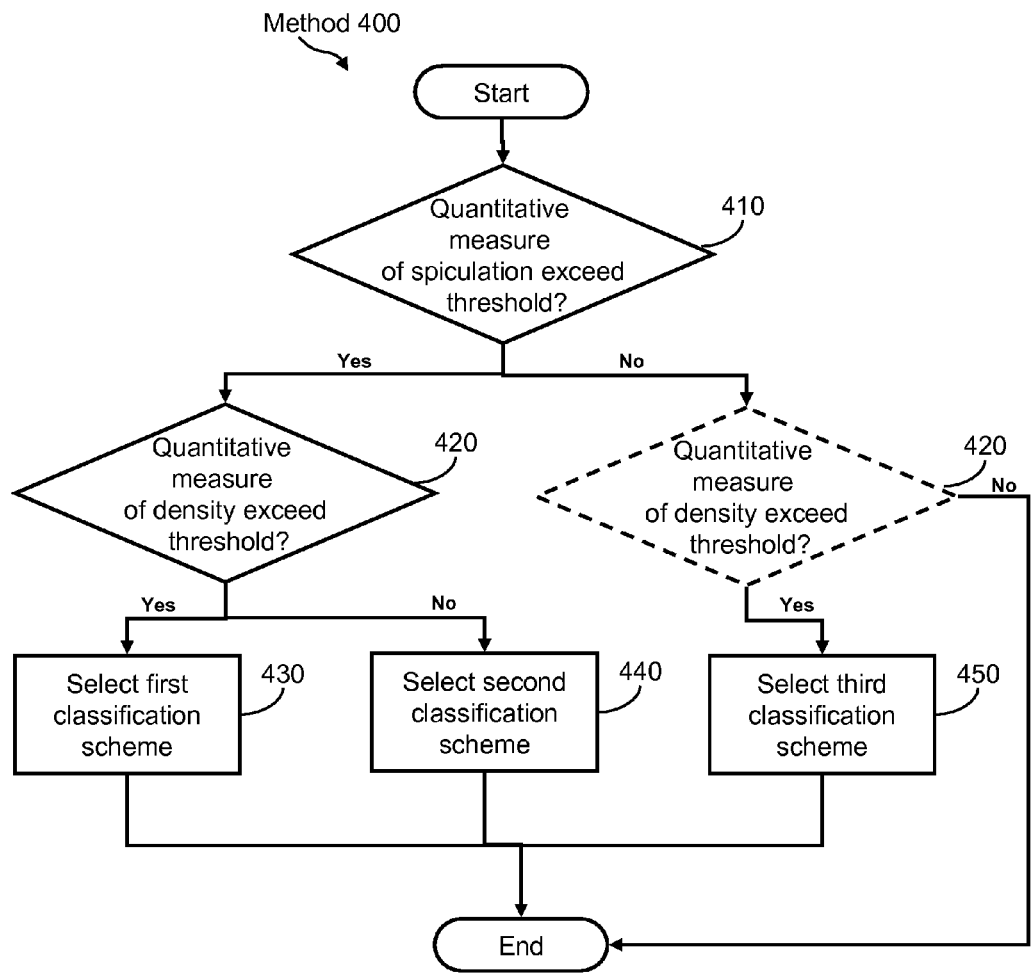
FIG. 4 illustrates the method steps performed by a CAD system showing how a classification scheme may be chosen based on quantitative measurements of mass spiculation and mass density in accordance with one embodiment.

FIG. 4 depicts the steps of a method 400 illustrating how a classification scheme may be chosen for a candidate from a combination of independent, quantitative measurements of spiculation and density computed at steps 130 and 140 in accordance with one embodiment. The steps of method 400 may be performed by a set of rules or other classification algorithm(s) that is well-known in the art. For a given candidate, the quantitative measurement of spiculation computed at step 130 may be compared against a predetermined spiculation threshold at step 410, and the quantitative measurement of density computed at step 140 may be compared against a predetermined density threshold at step 420. In certain embodiments, each threshold may be a binary indicator corresponding to whether a candidate was detected by an algorithm. For example, if one candidate was detected by a spiculation detection algorithm, the quantitative measurement (e.g. '1') passes a spiculation threshold (e.g. '0.5'), while if another candidate was not detected by a spiculation detection algorithm, the quantitative measurement (e.g. '0') does not pass the spiculation threshold. In certain other embodiments, each threshold may be a numerical score corresponding to a "cut-off" value of the spiculated lines or core area of a candidate. Candidates having a quantitative measurement above the "cut-off" have spiculated lines or core areas that are significant and should be considered when selecting a classification scheme, while candidates having a quantitative measurement below the "cut-off" have spiculated lines or core areas that are insignificant and should not be considered when selecting a classification scheme. Each threshold may be determined and set using a training process, which will be further described hereinbelow.

In one embodiment, three different classification schemes may be available in the CAD system and one of the three schemes may be chosen to perform step 150 based on threshold comparisons. If the quantitative measurement of spiculation and the quantitative measurement of density exceed both predetermined thresholds, a first classification scheme may be selected by the CAD system at step 430 to label the candidate to a class. The first classification scheme may be specially designed to classify candidates having both a significant quantitative measurement of spiculation and density. If only the quantitative measurement of spiculation exceeds the predetermined spiculation threshold, a second classification scheme may be selected by the CAD system at step 440 to label the candidate to a class. The second classification scheme may be specially designed to classify candidates having only a significant quantitative measurement of spiculation. If only the quantitative measurement of density exceeds the predetermined density threshold, a third classification scheme may be selected by the CAD system at step 450 to label the candidate to a class. The third classification scheme may be specially designed to classify candidates having only a significant quantitative measurement of density. In the event that both quantitative measures do not exceed their respective predetermined thresholds, the candidate may be automatically labeled by a false positive in accordance with one embodiment. In other embodiments, the thresholds may be set at levels so that all candidates must be classified using at least one of the three schemes.

In further embodiments, multiple classification schemes may be chosen for a candidate based on threshold values. For a given candidate, assume both quantitative measurements exceed their respective predetermined thresholds and thus, it can be assumed that the candidate has some amount of spiculation and some amount of density. However, assume that this same candidate has extremely well-defined spiculation that is an obvious sign of cancer or an obvious sign of a false positive. It would be desirable to classify this candidate on its spiculation alone without the influence of density. To accomplish this, in accordance one with one embodiment, the quantitative measurement of spiculation may be compared against a second, higher predetermined spiculation threshold. If the second predetermined spiculation threshold is exceeded, and the quantitative measurements of density exceeds the predetermined density threshold, a candidate may be classified twice: by the classification scheme specially designed to classify candidates having both a significant quantitative measurement of spiculation and density, and by a classification scheme specially designed to classify candidates having only a significant quantitative measurement of spiculation. A similar embodiment may be performed for candidates that have extremely well-defined density.

As is known in the art, each classification scheme may be developed from a training set of medical images in which the true positives have been "truthed" by a radiologist or other expert. Candidates may be first located by performing step 120 across all images in the set. Then, quantitative measurements of spiculation and density may be computed for each candidate located by performing step 130 and step 140. Various combinations of spiculation thresholds and density thresholds may be set and candidates may be assigned to a group by comparing the quantitative measurements to these thresholds using steps such as those described in reference to FIG. 4. Spiculation and density thresholds may be chosen from the training process so as to optimize performance of the methods and system disclosed herein on imagery in which true positives and false positives are unknown (e.g., imagery acquired in clinical practice). Using the "truth" information, each group of candidates will contain a set of true positives and a set of false positives. Independent feature selection steps may be performed on each of the groups. Feature selection is a well-known process in the field of machine learning and pattern recognition in which a developer selects, tests, and refines a set of feature characteristics that effectively separate a set of true positives from a set of false positives in a training set. The collective set of feature characteristics chosen is referred to as a feature vector. An important aspect of novelty in the methods disclosed herein is that by nature of separating the candidates according to spiculation and density, a feature vector selected for one group of candidates may therefore include a unique feature characteristic or combinations of unique feature characteristics that are not selected in the vectors developed for the other groups of candidates.

From each feature set, a classification algorithm or algorithms may then be developed or "trained" so that the algorithm(s) can output a classification decision for candidates using the vector of features and knowledge gained from the true positives and false positives in training Many types of classification algorithms exist and any of these algorithms may be used to perform classification in the methods disclosed herein. Examples of such classification algorithms include a linear classifier, a quadratic classifier, a neural network, a decision-tree, a fuzzy logic classifier, a support vector machine (SVM), a Bayesian classifier, or a k-nearest neighbor classifier, and other classification approaches as will be known by a person skilled in the art. It is standard practice to test the performance of any or all of the aforementioned algorithms on specific feature vectors chosen by the feature selection process, as classifier performance depends greatly on the characteristics of the data to be classified. There is no single classifier that works best on all given problems. Accordingly, a further important aspect of novelty in the methods disclosed herein is that by nature of separating the candidates according to spiculation and density, the classification algorithm(s) developed and used to classify one group of candidates may therefore be of different types and/or include unique rules that are not developed and not used to classify the other two groups of candidates.

At step 160, the appropriate classification scheme chosen at step 150 is performed on each candidate. Each feature characteristic in the vector developed for the classification scheme is computed on the candidate and used to assign the candidate to a class. In one example, the classification schemes disclosed herein may classify each mass candidate with a "hard" decision (i.e., a true positive or a false positive) that is directly used to determine whether a candidate should be outputted to a physician or other user of the CAD system. In another example, the classification algorithms may classify each candidate with a "soft" decision (i.e., a probability of malignancy), which may then be used at a later step to determine whether each particular candidate should be outputted.

In certain embodiments, the results of classification may be fused together to determine which candidates to output to a user. In one embodiment, the probabilities of malignancy (i.e., cancer) calculated for each candidate by the respective classification algorithms may be compared against a single predetermined system operating point or threshold. All detections that satisfy the system operating point may be outputted. One technique for calculating an optimal threshold for a plurality of classification algorithms at a single, given, system operating point is a Pareto front, which is known in the art. There are many techniques for fusing the results of classification algorithms that are known in the art and any of these may be used. For example, various examples of such techniques can be seen in "A Theoretical Study on Six Classifier Fusion Strategies" by Ludmilla I. Kuncheva, IEEE TRANSACTIONS ON PATTERN ANALYSIS AND MACHINE INTELLIGENCE, VOL. 24, NO. 2, FEBRUARY 2002 281-286.

At step 170, the original breast imagery and list of suspicious masses are output to a physician or other user via a graphical user interface (e.g. a computer monitor), a printed report, an electronic storage file, or other known media for outputting computer-aided detection results to a user. Many breast images will be processed in accordance with the methods disclosed herein but contain no suspicious regions, which suggests to a physician that the patient's breast is normal, healthy, or without indicators of cancer. Thus, in certain embodiments, the CAD system will output zero suspicious masses detected and classified in accordance with the methods disclosed herein. In this case, the absence of suspicious regions in the image is as substantially important as the presence of suspicious regions. In certain other embodiments, the CAD system will output one or more suspicious masses detected and classified in accordance with the methods disclosed herein. This suggests to a physician that the patient's breast may be abnormal, unhealthy, or possibly with indicators of cancer. In this case, the physician's attention is drawn to these regions for further evaluation. Various examples in which suspicious regions classified by CAD algorithms may be specially depicted and outputted as "CAD marks" are known in the prior art. Any of these may be used to specially depict the suspicious masses identified using the methods disclosed herein.

Examples of the three classification schemes that were developed by applying the quantitative measurements of spiculation and density to candidates identified in a training set will now be fully described. The following examples serve to illustrate the novelty in which a unique classification scheme may be developed for candidates having only spiculation, only density, or both spiculation and density. However, one skilled in the art will recognize that other variations of feature measurements, combinations of feature measurements, classification rules, types of classifiers, and combinations of classifiers may be developed and employed for performing the classification methods on candidate masses detected and determined to have such quantitative measurements as described herein.

Exemplary Implementation: Classification of Highly Spiculated Candidates

By identifying and isolating candidates having only high quantitative spiculation, cancers such as architectural distortions 310 could be studied against only highly spiculated false positives identified by our detection algorithms, such as crossing linear structures or wispy parenchyma. Such cancers were relatively easy to distinguish from false positives when a unique classification scheme was developed in our training set from the true positives and false positives measured to have only high spiculation in accordance with the methods disclosed herein. We developed a single vector of features that were highly weighted to characterize the spiculation of the candidates, such as the texture, the linear flow, the linear structure, and/or the margin of the region. Other non-spiculation features were also chosen to characterize the candidate, such as the location of the region in the breast. A two-member committee of linear classifiers was trained from the single feature vector and implemented to perform the classification methods disclosed herein. The classification algorithm applied the features that characterize the spiculation of the candidate with substantially higher weighting than the other features in the vector in calculating a probability of malignancy.

Exemplary Implementation: Classification of Highly Spiculated and Highly Dense Candidates Because there are few false positives having both converging line structure and well circumscribed core characteristics, we were able to isolate a large class of cancers by identifying candidates such as spiculated density masses 330 and asymmetric densities 340, both of which have high quantitative spiculation and density. We developed a single vector of features that were substantially equally weighted to characterize both the spiculation and the density of the candidate. Exemplary features in this vector include the texture, the linear flow, the linear structure, and/or the margin of the lines and core of each candidate. A single linear classifier was trained from this single feature vector and implemented to perform the classification methods disclosed herein. The classification algorithm applied the features that characterize both the spiculation and the density of the candidate with substantially equal weighting in calculating a probability of malignancy.

Exemplary Implementation: Classification of Highly Dense Candidates

By identifying and isolating candidates having only high quantitative density, we were able to isolate the largest source of false positives identified by our detection algorithms. However, a high number of cancers such as circumscribed masses 320 were also found to have only high quantitative measures of density. We found that to separate the true positives and false positives from these candidates, a single classification scheme provided highly suboptimal results, and that a substantially different and more robust classification scheme was required. After first isolating this class of candidates from the other classes in accordance with the methods disclosed herein, we then researched various other ways to subdivide these candidates. In one embodiment, the candidates were subdivided according to the geographical location in which they appear in the breast image and classified using a plurality of linear classifiers. This embodiment will be fully described in reference to FIGS. 5-7. Such an embodiment was performed for the candidates having high quantitative measures of density because a larger percentage of dense, mass-like false positives exist in the parenchyma region of the breast versus any other region of the breast. This occurs because areas of the parenchyma itself, especially those in dense breasts, share many characteristics of density cancers such as size, brightness, etc. Thus, we evaluated these candidates using different classification schemes according to location. While geographical location provided one basis in which to subdivide candidates in this class, one skilled in the art will recognize that numerous other approaches may be used. Examples include, but are not limited to, detection size or area, margin, breast density, total detections in the image, type of sensor that acquired the image, etc. Additional bases may further be automatically computed or determined using the assistance of a classification and regression tree (CART), which is known in the art.

Classification of Masses by Breast Location

Figure 5:
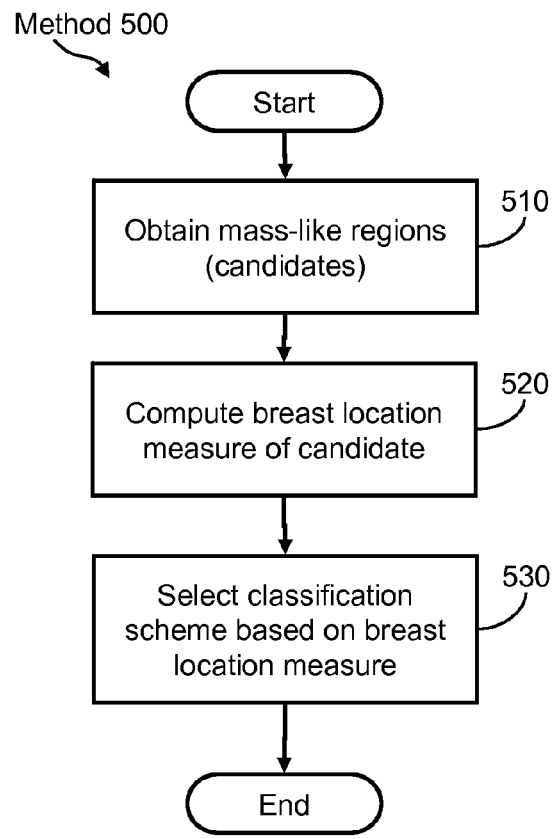
FIG. 5 illustrates the method steps performed by a CAD system to classify mass true positives from mass false positives based on a measure of location.

FIG. 5 is a flowchart setting forth the overall steps of a method 500 performed by a CAD system to classify mass true positives from mass false positives based on a measure of location hereinabove in accordance with one embodiment. The candidates input to this method at step 510 may be candidate masses determined to have densities exceeding a threshold. Such a determination may be made in accordance with the method described in reference to FIG. 4 and thus, in accordance with one embodiment, method 500 may be representative of the third classification scheme selected as fully described at step 450 of FIG. 4. In other embodiments, the following methods may also be executed to classify candidate masses that have density as determined by other approaches such as, but not limited to, the execution of a density detection algorithm.

For each candidate detected in the breast and on which is to be performed the classification methods disclosed herein, a feature measure is computed as to the location of the candidate in the breast at step 520. In one embodiment, the feature may measure whether the candidate appears inside of the parenchyma region of the breast or outside of the parenchyma region of the breast. From such a feature measure, candidates can be divided into one of at least two groups based on location: candidates inside of the parenchyma and candidates outside of the parenchyma. To compute such a feature, the parenchyma region of the breast must be first identified with a high level of accuracy, as the location of this region will vary from mammogram to mammogram. Techniques for identifying the parenchyma region in breast mammograms are well known in the art. These techniques include fuzzy classification algorithms, rule-based pixel logic, or simple thresholding of features such as contrast or intensity to identify the parenchyma from the background of the breast.

Figure 6:
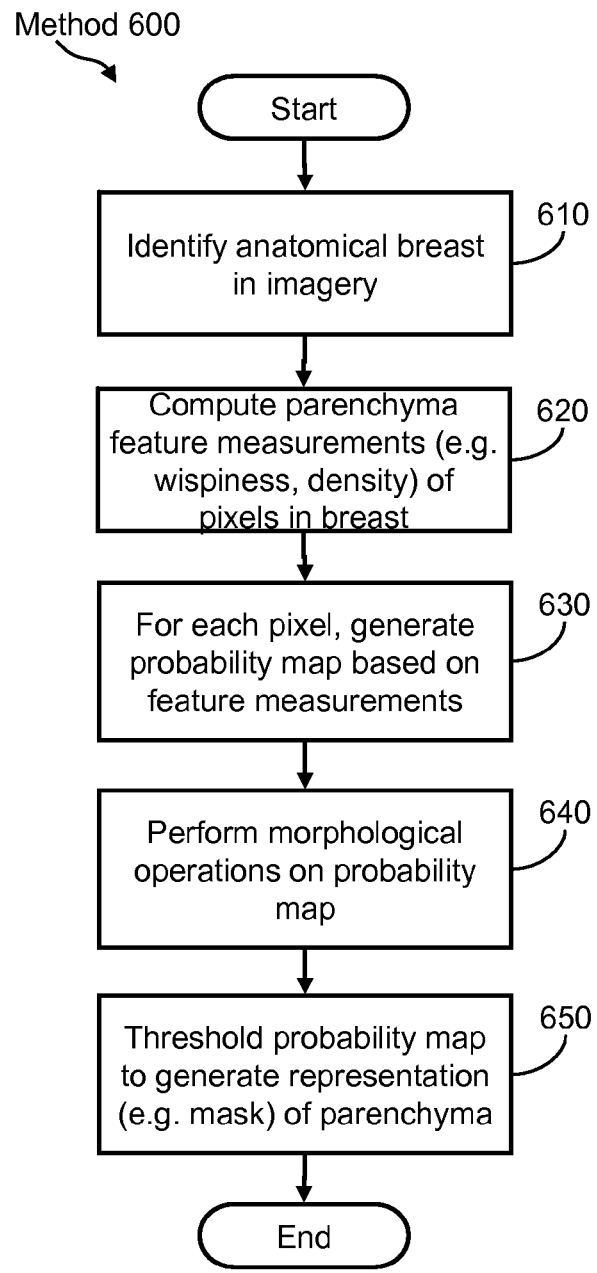
FIG. 6 illustrates the steps for detecting the parenchyma region of the breast in accordance with one embodiment.

In one embodiment, the steps described in FIG. 6 can be performed to identify the parenchyma region of the breast. At step 610, the breast region is identified so that additional operations to identify the parenchyma are executed only within the breast region that includes the parenchyma. One example of a suitable technique that can be used for identifying the breast region can be seen in U.S. Pat. No. 6,091,841, "Method and system for segmenting desired regions in digital mammograms," assigned to Qualia Computing, Inc. Calculations that identify the breast region may be used in combination with calculations that identify the pectoral mask. At step 620, various feature characteristics of the parenchyma are calculated for each pixel in the breast region, such as an estimate of wispiness or density. At step 630, a probability map is generated that assigns a probability that each pixel in the region is part of the parenchyma region based on the feature characteristics calculated at step 620. Values of the probability map may then be compared against a threshold to eliminate regions that are clearly not part of the parenchyma. At step 640, various morphological operations are executed that improve the probability estimates calculated at step 630. For example, pixels that have low probability values but are surrounded by a substantial number of pixels having high probability values may be reclassified as having a higher probability of being part of the parenchyma. The parenchyma region can then be derived from the probability map using another thresholding operation at step 650, where pixels in the probability map having values over a predetermined threshold are considered part of the parenchyma and pixels in the probability map having values under a predetermined threshold are not.

In other embodiments, the feature measure computed as to the location of the candidate in the breast may further measure whether candidates that appear outside of the parenchyma region are in the chest wall or pectoral muscle. This allows the CAD system to address candidates in the "danger zone", which is the region outside of the parenchyma, chest wall, and pectoral muscle that, on average, contains a larger percentage of mass cancers than any other region of the breast, with a unique classification scheme. From this feature measure, candidate densities can be divided into one of at least four groups based on location: candidate densities in the pectoral muscle; candidate densities in the chest wall; candidate densities outside of the parenchyma, pectoral muscle, and chest wall regions; and candidate densities inside the parenchyma. In certain other embodiments, the feature measure computed as to the location may further measure whether candidates that appear inside of the parenchyma region are on the fringe of the parenchyma (e.g., 1 centimeter from the edge of the parenchyma region detected).

Identification of the Chest Wall and Pectoral Muscle

Figure 7:
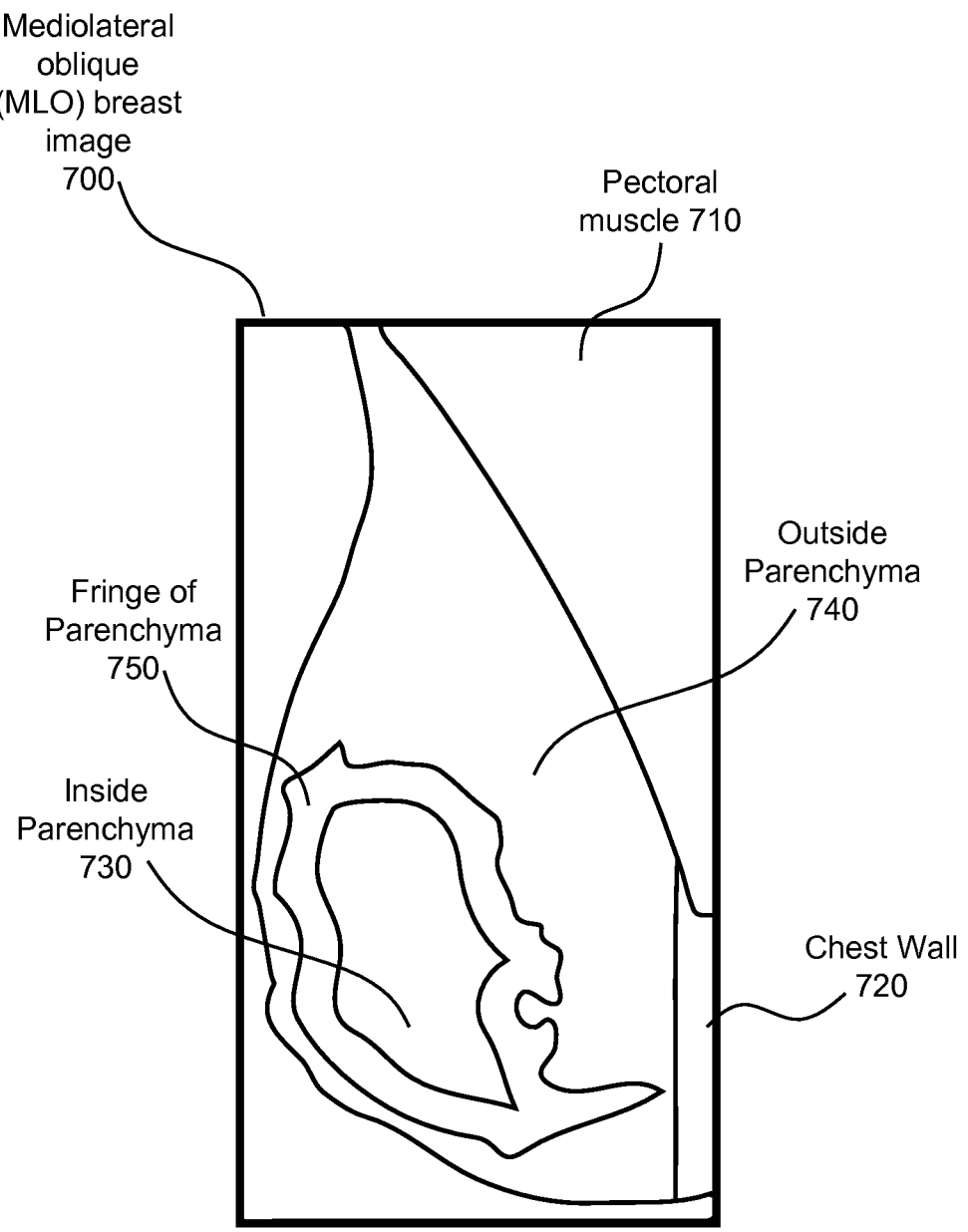
FIG. 7 illustrates examples of the chest wall, pectoral muscle, inside parenchyma, outside parenchyma, and parenchyma fringe regions of a planar breast image.

In embodiments in which the location feature measures whether candidates that appear outside of the parenchyma region are in the chest wall or pectoral muscle, the pectoral muscle and chest wall regions must also be detected in the image. Techniques for identifying the pectoral muscle in breast mammograms are well known and well described in the art. Several approaches to pectoral muscle segmentation can be seen in Kwok et al, "Automatic Pectoral Muscle Segmentation on Mediolateral Oblique View Mammograms," *Recent Advances in Breast Imaging, Mammography, and Computer-Aided Diagnosis of Breast Cancer*, pp. 613-636 (SPIE Press, Bellingham, Wash., 2006). Techniques for identifying the chest wall in breast mammograms are also well known and typically involve first identifying the side of the image in which the chest wall will appear (e.g. right, left) and then identifying a region extending approximately 1 centimeter in distance from the side of the image out to the breast region as the chest wall. FIG. 7 illustrates a mediolateral oblique (MLO) image 700 of a breast with all five regions clearly identified in which each region may be identified using the aforementioned identification techniques.

Each subset of candidate densities can be identified in each location using rules-based logic in accordance with one embodiment. For example, if a candidate overlaps multiple locations, the amount that the region overlaps with each location may be first calculated. The candidate may be assigned to the location with the greatest measure of overlap. In another example, if a candidate overlaps multiple locations, the centroid of the region may be first calculated, and the candidate assigned to the location in which the centroid appears.

At step 530, a classification scheme (i.e., one or more feature vectors and one or more classifier algorithms) is chosen based on the feature measure of location computed at step 530. Classification schemes were developed from a training set in which true positives and false positives identified to have density were separated according to the various location feature measures disclosed herein. We were able to develop a plurality of classification algorithms that detect and eliminate specific false positives known to appear in each location. For example, in certain embodiments, classifiers may be developed to detect and remove candidates inside of the parenchyma as false positives using features of the parenchyma itself (e.g., length and width characterizing the stringiness), candidates in the pectoral muscle as false positives using features of lymph nodes, and candidates in both pectoral muscle and chest wall as false positives using features of skin folds. Thus, the features in each vector may be different according to location.

By separating the candidates in a training set according to geographical location, we found that true positives and false positives in one location of the breast may exhibit different characteristics from true positives and false positives in other locations of the breast in certain embodiments. Thus, unique feature vectors and unique classification schemes may be developed to classify the true positives from false positives in each location. For example, features that describe the margin of mass detections (i.e., edge-based features) may be particularly useful in establishing malignancy. However, in the chest wall, masses often exist at the edge of the image in which some of the region is "cut off". Thus, features that describe the margin of the region may be avoided in the feature vector developed for candidates appearing in the chest wall, as they often contribute to misclassification. However, such features may be chosen to address candidates in locations other than the chest wall.

Further, in certain embodiments, classification schemes may be developed that utilize the same feature characteristic measures differently. In the art, the amount that a feature can be used or weighted to indicate that a candidate belongs to a specific class is referred to as the "discriminating power" of the feature. For example, features that describe the brightness of candidate masses (i.e., a histogram measurement) may be particularly useful in establishing malignancy. However, the parenchyma itself contains a significant amount of brightness while regions outside of the parenchyma are generally less bright. Thus, while a histogram measurement of brightness may be used as a feature with substantial discriminating power for classifying candidates outside of the parenchyma, the same discriminating power may not be used for classifying candidates inside of the parenchyma, as a larger number false positives inside the parenchyma may also exhibit these measures of brightness. Further, brightness may be used as a feature with more discriminating power in classifying candidates outside of the parenchyma versus in the pectoral muscle or chest wall, as the region outside of the parenchyma is generally less bright. Further still, measures of roundness may be used a feature with more discriminating power for candidates that appear in the pectoral muscle or in the chest wall versus candidates that appear outside of the parenchyma.

Further yet, in certain embodiments, the classification algorithms themselves may vary so as to maximize performance in accordance with the feature vectors developed in each location. For example, a "subtle" versus "obvious" classification method (see for example, "Dual system approach to computer-aided detection of breast masses on mammograms" by Wei et al., *Med. Phys* 33 (11) November 2006, pp. 4157-4168) and/or a cascaded "hard" and "soft" classification method (see for example, "False-positive reduction in CAD mass detection using a competitive classification strategy" by Li et al., *Med. Phys* 28 (2) February 2001, pp. 250-258) may be developed to perform classification on candidates in a given breast location. In other embodiments, single classifiers (e.g., a linear classifier) or committees of classifiers (e.g., a committee of linear classifiers) may be developed to perform classification.

The previous examples serve to illustrate the novelty in which different classification schemes may be developed for candidates according to the location in which they appear in the breast. One skilled in the art will recognize that other variations of feature measurements, combinations of feature measurements, classification rules, types of classifiers, and combinations of classifiers may be developed and employed for performing the classification methods on candidate masses detected within the various locations disclosed herein.

Exemplary Computer System

FIG. 8 is a block diagram of an illustrative computer system 800 on which the methods disclosed herein may be practiced. Other embodiments of computer systems, however, may be utilized. Computer system 800 may include an acquisition station, a review workstation, and/or a CAD system, all of which are well-known in the art and may be suitable for practicing the methods disclosed herein. As shown in FIG. 8, computer system 800 may comprise a processor 810, a memory 815, an input interface 820, an output interface 825, and program code 830. Input interface 820 may connect processor 810 to an input device such as keyboard 840, mouse 845, or other suitable device for communicating commands from the device to the processor. Output interface 825 may further be connected to processor 810 and an output device such as a graphical user interface (GUI) 835.

Memory 815 may include conventional semiconductor random access memory (RAM) 850 or other forms of memory known in the art; and one or more computer readable-storage media 860, such as a hard drive, floppy drive, read/write CD-ROM, tape drive, etc. Stored in program code 830 may be an operating system 865 and application programs 870 with instructions that can be read and executed by computer system 800 for detecting, classifying and displaying suspicious masses and breast images in accordance with the methods disclosed herein.

Applications of the Invention to Other Medical Imagery

While the methods and systems have been described herein with reference to computer-aided detection of mass cancers in breast mammograms, it is further noted that one or more of the embodiments described herein may be applied to the computer-aided detection of other regions of interest in other types of medical imaging. This may include, but is not limited to, the computer-aided detection and classification of mass-like cancers in tomographic (e.g., digital breast tomosynthesis, computed tomography or positron emission tomography), magnetic resonance (MR), or ultrasound imaging of the breast; and/or the computer-aided detection and classification of mass-like cancers in the colon, lung, chest, brain, or other anatomical region.

What is claimed is:

1. A system for the automated classification of suspicious masses in medical imagery of the breast, the system comprising:
 a. means for locating one or more suspicious masses in medical imagery of the breast;
 b. means for computing, for one or more of the suspicious masses located, a quantitative measure of spiculation of the suspicious mass and a quantitative measure of density of the suspicious mass;
 c. means for selecting at least one classification scheme from a plurality of classification schemes for classifying the suspicious mass, wherein the selection is based on the quantitative measure of spiculation and the quantitative measure of density; and
 d. means for assigning the suspicious mass to a class by executing the selected at least one classification scheme on the suspicious mass.

2. A system for the automated classification of suspicious masses in medical imagery of the breast, the system comprising:
 a. means for detecting one or more candidate suspicious masses in medical imagery of the breast;
 b. means for characterizing the spiculatedness of each of the one or more candidate masses;
 c. means for characterizing the density of each of the one or more candidate masses;
 d. means for selecting at least one feature set from a plurality of predefined feature sets based at least on the characterized spiculatedness and the characterized density of each of the one or more candidate masses; and
 e. means for determining the suspiciousness of each of the one or more candidate masses based at least on the selected at least one feature set.

3. The system of claim 2, wherein the medical imagery of the breast is a mammogram.

4. The system of claim 2, wherein the means for selecting comprises a means for selecting at least one feature set based on whether the characterized spiculatedness exceeds a spiculatedness threshold and whether the characterized density exceeds a density threshold.

5. A system for the automated detection of cancers in a medical image, comprising:
 a. a detector for detecting one or more candidate cancers in the medical image;
 b. a characterizer for characterizing each of the detected one or more candidate cancers on the basis of a set comprising two or more predetermined characteristics known to distinguish cancers from non-cancers;
 c. a set of at least three software classifiers for determining the suspiciousness of the detected one or more candidate cancers, wherein each software classifier is designed to distinguish cancers that exhibit a unique combination of predetermined characteristics in the set from non-cancers that exhibit the unique combination of predetermined characteristics in the set.

6. The system of claim 5, wherein the two or more predetermined characteristics include density and spiculatedness.

7. The system of claim 6, wherein the set of at least three software classifiers consists of:
 at least one software classifier designed to distinguish cancers that exhibit only density characteristics from non-cancers that exhibit only density characteristics;
 at least one software classifier designed to distinguish cancers that exhibit only spiculatedness characteristics from non-cancers that exhibit only density characteristics; and
 at least one software classifier designed to distinguish cancers that exhibit density characteristic and spiculatedness characteristics from non-cancers that exhibit density characteristic and spiculatedness characteristics.

8. The system of claim 6, wherein the detector detects candidate breast mass cancers in mammograms.

9. The system of claim 6, further comprising a graphical user interface for outputting indicators as to one or more candidate masses determined to be suspicious.

* * * * *